United States Patent
Tanaka

(10) Patent No.: US 7,498,972 B2
(45) Date of Patent: Mar. 3, 2009

(54) OBSTACLE DETECTION SYSTEM FOR VEHICLE

(75) Inventor: Hideaki Tanaka, Nagoya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 11/811,016

(22) Filed: Jun. 7, 2007

(65) Prior Publication Data

US 2007/0285305 A1 Dec. 13, 2007

(30) Foreign Application Priority Data

Jun. 13, 2006 (JP) ............................. 2006-163978

(51) Int. Cl.
*G01S 13/93* (2006.01)
*G01S 13/42* (2006.01)
*G01S 13/58* (2006.01)
*G01S 13/86* (2006.01)

(52) U.S. Cl. .............................. 342/70; 342/52; 342/54; 342/104; 342/105; 342/107; 342/195

(58) Field of Classification Search ............. 342/70–72, 342/52, 54, 104–117, 159, 195; 701/117–119, 701/300–302; 382/103–107; 340/435–436, 340/901–905

See application file for complete search history.

(56) References Cited

U.S. PATENT DOCUMENTS

| | | | | |
|---|---|---|---|---|
| 5,574,463 A | | 11/1996 | Shirai et al. | |
| 6,163,252 A | * | 12/2000 | Nishiwaki | 340/435 |
| 7,142,150 B2 | * | 11/2006 | Thackray | 342/54 |
| 7,289,059 B2 | * | 10/2007 | Maass | 342/70 |
| 7,397,357 B2 | * | 7/2008 | Krumm et al. | 340/501 |
| 2005/0125154 A1 | * | 6/2005 | Kawasaki | 701/301 |
| 2006/0177099 A1 | * | 8/2006 | Zhu et al. | 382/104 |
| 2007/0286475 A1 | * | 12/2007 | Sekiguchi | 382/154 |
| 2008/0031492 A1 | * | 2/2008 | Lanz | 382/103 |

FOREIGN PATENT DOCUMENTS

| | | |
|---|---|---|
| JP | 7-318652 | 12/1995 |
| JP | 11-038141 | 2/1999 |

* cited by examiner

*Primary Examiner*—Thomas H Tarcza
*Assistant Examiner*—Cassi Galt
(74) *Attorney, Agent, or Firm*—Harness, Dickey & Pierce, PLC

(57) ABSTRACT

An obstacle detection system determines a probability distribution of existence of an obstacle object corresponding to a distance in an irradiation direction of a transmission wave based on detected strength data per scanning-angle supplied from a radar device. A peak-value of the strength data becomes a maximum probability of existence of the obstacle. The probability distribution has a range gradually decreasing before and after the peak-value. Even if the position indicated by the maximum probability of existence of the obstacle object is different from an actual distance to the obstacle object, it hardly occurs that the probability of existence at an actual position of the obstacle object becomes zero. This eliminates occurrence of separation/association errors. Primary and secondary existence probability relationships made based on the probability distribution are combined. Using the combined one further decreases the error detection.

14 Claims, 8 Drawing Sheets

OBSTACLE DETECTION SYSTEM FOR VEHICLE

CROSS-REFERENCE TO RELATED APPLICATION

This application is related to and claims priority from Japanese Patent Application No. 2006-163978 filed on Jun. 13, 2006, the contents of which are hereby incorporated by reference.

BACKGROUND OF THE INVENTION

1. Field of the Invention

The present invention relates to an obstacle detection system for a vehicle capable of detecting objects such as a forward vehicle and obstacles based on detected data supplied from object sensors.

2. Description of the Related Art

An obstacle detection system for a vehicle using a radar device has been widely known. For example, Japanese patent laid open publication No. JP H11-38141 has disclosed such a related-art obstacle detection system for a vehicle.

Such an obstacle detection system using the radar device emits a transmission wave such as laser light and millimeter wave around a vehicle within a predetermined sweep angle with a predetermined sweep cycle (or a scanning cycle). The obstacle detection system receives the reflected transmission wave reflected by the obstacle, and recognizes the existence of the obstacle. In the obstacle recognizing process, the obstacle detection system calculates a distance between the vehicle and the target obstacle object such as a forward vehicle based on the time length counted from the time of emitting the transmission wave (as laser light) to the time of receiving the reflected transmission wave from the obstacle object. Such an obstacle detection system is used for various applications, for example, a system for detecting a forward vehicle as the obstacle object and activating an alarm so as to inform the existence of the obstacle object to the driver of the vehicle, and another system for automatically controlling the speed of the vehicle in order to keep a predetermined distance between the relevant vehicle and the vehicle.

In the related-art obstacle detection system disclosed in JP H11-38141, the scanning of the transmission wave as the laser light is performed while gradually changing the irradiation angle of the laser light, and one value "r" as the distance to an obstacle is determined based on a time length, per irradiation angle, from the irradiation to the reception of the reflected laser light from the obstacle.

However, because such a laser system inherently involves various matters causing errors, there is a possibility of being a difference between the calculated distance "r" to the obstacle and the actual distance to the obstacle. In other words, the calculated distance "r" includes an error.

The system disclosed in JP H11-38141 recognizes the obstacle as a point per transmission wave, and integrates continuous points in order to determine a range of the obstacle. In general, although each detected point has an error, the related-art system disclosed in JP H11-38141 causes an error detection and recognition in which different obstacle objects such as a vehicle and a pedestrian are recognized as one obstacle object (also referred to as "association error") or one obstacle object is recognized as two obstacle objects (also referred to as "separation error").

There are various types of object sensors such as a sensor equipped with a stereo camera other than a radar system. However, because each object sensor inherently involves obligatory detection error, the system using such an object sensor causes error recognition such as the separation and association of obstacles.

SUMMARY OF THE INVENTION

It is an object of the present invention to provide an improved obstacle detection system for a vehicle capable of correctly detecting and recognizing obstacles without recognition errors such as separation error in which one obstacle object is recognized as two or more obstacle objects and association error in which two or more obstacle objects are recognized as one obstacle.

To achieve the above purposes, the present invention provides an obstacle detection system for a vehicle, in accordance with a first aspect of the present invention, capable of detecting objects as obstacles existing around a vehicle based on a detection signal irradiated toward and reflected from the objects per predetermined detecting period of scanning the detection signal. The obstacle detection system has an object sensor, a probability distribution determining means, a primary probability relationship making means, a combining means, a speed calculating means, and a secondary probability relationship making means. The object sensor is configured to detect existence/non-existence and a position of an object within a predetermined detection range outside of the vehicle based on the detection signal received. The probability distribution determining means is configured to determine an existence probability distribution of the obstacle in a detecting direction toward the obstacle from the object sensor, and a maximum value in the existence probability distribution is used as a maximum probability of position of the obstacle, and the existence probability distribution has a range gradually decreased before and after the maximum probability of position of the obstacle in the detecting direction. The primary probability relationship making means is configured to make a primary existence probability relationship representing a primary probability of existence of the obstacle in a horizontal plane coordinate using a plurality of the existence probability distributions throughout the entire of the predetermined detection range. The combining means is configured to make a combined existence probability relationship by combining the primary existence probability relationship obtained in a current detecting period and a secondary existence probability relationship estimated based on a previous detection signal in a previous detecting period corresponding to the primary existence probability relationship of the current detecting period. The speed calculating means is configured to calculate an estimated moving speed of the obstacle during a period from the detecting period of two times before to the previous detecting period based on the combined existence probability relationship obtained in the previous detecting period and the combined existence probability relationship obtained in the detecting period of two times before. The secondary probability relationship making means is configured to make the secondary existence probability relationship based on the estimated moving speed of the obstacle and the combined existence probability relationship during the previous detecting period.

According to the first aspect of the present invention, the probability distribution determining means determines the probability distribution of existence of the obstacle in the irradiating direction from the object sensor toward the detected object. This probability distribution takes the position at which the object is detected as the maximum probability of existence of the object. The probability distribution has the range gradually decreased before and after the maximum probability. Accordingly, even if a difference or error occurs between the position indicated by the maximum probability of the obstacle in the probability distribution and the actual position of the obstacle, the possibility having the probability of zero for the point where the actual obstacle exists becomes low. This can reduce the occurrence of the error detection. Therefore the error recognition such as separation error and association error to be caused by error detection hardly occurs. The primary probability relationship making means makes the primary existence probability relationship based on the probability distribution obtained above. In addition, the combining means makes the combined existence probability relationship by combining the primary existence probability relationship obtained in a current detecting period and the secondary existence probability relationship estimated based on a previous detection signal in a previous detecting period corresponding to the primary existence probability relationship of the current detecting period. By using the combined existence probability relationship, it is possible to further reduce the occurrence of the error detection of the obstacle when compared with the case using only the primary existence probability relationship.

In accordance with a second aspect of the present invention, there is provided an obstacle detection system for a vehicle capable of detecting objects as obstacles existing around a vehicle based on a detection signal irradiated toward the objects and reflected from the objects per predetermined detecting period of scanning the detection signal. The obstacle detection system has an object sensor composed of a primary object sensor and a secondary object sensor, a primary probability distribution determining means, a secondary probability distribution determining means, a probability relationship making means, and a combining means. The primary object sensor and the secondary object sensor are different in detecting manner to each other. Each object sensor is configured to detect existence/non-existence and a position of an object within a predetermined detection range outside of the vehicle based on the detection signal received. The primary probability distribution determining means is configured to determine an existence probability distribution of the obstacle in a primary detecting direction toward the obstacle from the primary object sensor. The maximum value in the existence probability distribution is used as a maximum probability of position of the obstacle. The existence probability distribution has a range gradually decreased before and after the maximum probability of position of the obstacle in the primary detecting direction. The secondary probability distribution determining means is configured to determine an existence probability distribution of the obstacle in a secondary detecting direction toward the obstacle from the secondary object sensor. The maximum value in the existence probability distribution is used as a maximum probability of position of the obstacle. The existence probability distribution has a range gradually decreased before and after the maximum probability of position of the obstacle in the secondary detecting direction. The probability relationship making means is configured to make a primary existence probability relationship representing a primary probability of existence of the obstacle in a horizontal plane coordinate using a plurality of the existence probability distributions obtained by the primary probability distribution determining means throughout the entire of the predetermined detection range, and further to make a secondary existence probability relationship representing a secondary probability of existence of the obstacle in a horizontal plane coordinate using a plurality of the existence probability distributions obtained by the secondary probability distribution determining means throughout the entire of the predetermined detection range. The combining means is configured to make a combined existence probability relationship by combining the primary existence probability relationship and the secondary existence probability relationship made by the probability relationship making means.

According to the second aspect of the present invention, the primary and secondary probability distribution determining means determine existence probability distributions of the obstacle in the primary and secondary detecting directions toward the obstacle from the primary and secondary object sensors, respectively. The maximum value in each existence probability distribution is used as a maximum probability of position of the obstacle. Each existence probability distribution has a range gradually decreased before and after the maximum probability of position of the obstacle in each of the primary and secondary detecting directions. The possibility having the probability of zero for the point where the actual obstacle exists becomes low. This can reduce the occurrence of the error detection. Therefore the error recognition such as separation error and association error to be caused by error detection hardly occurs. The probability relationship making means makes the primary existence probability relationship representing the primary probability of existence of the obstacle in the horizontal plane coordinate using a plurality of the existence probability distributions obtained by the primary probability distribution determining means throughout the entire of the predetermined detection range, and further makes a secondary existence probability relationship representing the secondary probability of existence of the obstacle in the horizontal plane coordinate using a plurality of the existence probability distributions obtained by the secondary probability distribution determining means throughout the entire of the predetermined detection range. Those primary and secondary existence probability relationships are made by using the two object sensors of different detection manners. The different detection manner can easily detect different types of the objects. Accordingly, the use of the combined existence probability relationship obtained by combining the primary and secondary existence probability relationships by the combining means provides that the probability of existence of the actual obstacle becomes hardly zero when compared with the case using each of the primary and secondary existence probability relationships. Accordingly, the occurrence of the error detection of the obstacle using the combined existence probability relationship can be further reduced when compared with the case using only one of the primary and secondary existence probability relationships.

In accordance with a third aspect of the present invention, there is provided an obstacle detection system for a vehicle capable of detecting objects as obstacles existing around a vehicle. The obstacle detection system has a radar device, a probability distribution determining means, a primary probability relationship making means, a combining means, a speed calculating means, and a secondary probability relationship making means. The radar device is configured to irradiate a transmission wave to the outside of a vehicle within a predetermined scanning-angle range per predetermined scanning period, and to receive the transmission wave reflected by an object as an obstacle and to detect existence/non-existence and position of the obstacle based on the reflected transmission wave. The probability distribution determining means is configured to determine an existence probability distribution of the obstacle to a distance of the transmission wave toward its irradiation direction based on a relationship between an elapsed time counted from the irradiation of the transmission wave and the strength of the reflected transmission wave. A maximum value in the strength of the reflected transmission wave is used as a maximum probability of position of the obstacle, and the existence probability distribution has a range gradually decreased before and after the maximum probability of position of the obstacle. The primary probability relationship making means is configured to make a primary existence probability relationship representing a primary probability of existence of the obstacle in a horizontal plane coordinate using a plurality of the existence probability distributions determined by the probability distribution determining means based on the transmission wave irradiated throughout the entire of the scanning-angle range. The combining means is configured to make a combined existence probability relationship by combining the primary existence probability relationship obtained in a current scanning period and a secondary existence probability relationship estimated based on a previous detection signal in a previous scanning period corresponding to the primary existence probability relationship of the current scanning period. The speed calculating means is configured to calculate an estimated moving speed of the obstacle during a period from the scanning period of two times before to the previous scanning period based on the combined existence probability relationship obtained in the previous scanning period and the combined existence probability relationship obtained in the scanning period of two times before. The secondary probability relationship making means is configured to make the secondary existence probability relationship based on the estimated moving speed of the obstacle and the combined existence probability relationship during the previous scanning period.

According to the third aspect of the present invention, the probability distribution determining means determines an existence probability distribution of the obstacle to a distance of the transmission wave toward its irradiation direction of each transmission wave. The maximum value in the strength of the reflected transmission wave is used as a maximum probability of position of the obstacle. The existence probability distribution has a range gradually decreased before and after the maximum probability of position of the obstacle. Accordingly, even if a difference or error occurs between the position indicated by the maximum probability of the obstacle in the probability distribution and the actual position of the obstacle, the possibility having the probability of zero for the point where the actual obstacle exists becomes low. This can reduce the occurrence of the error detection. Therefore the error recognition such as separation error of the obstacle and association error of the obstacles to be caused by error detection hardly occurs. Like the first aspect of the present invention described above, the combining means make a combined existence probability relationship by combining the primary existence probability relationship obtained in a current scanning period and the secondary existence probability relationship estimated based on the previous detection signal in the previous scanning period corresponding to the primary existence probability relationship of the current scanning period. Accordingly, the occurrence of the error detection of the obstacle using the combined existence probability relationship can be further reduced.

In accordance with a fourth aspect of the present invention, there is provided an obstacle detection system for a vehicle capable of detecting objects as obstacles existing around a vehicle. The obstacle detection system has a radar device comprising a primary radar device and a secondary radar device, a primary probability distribution determining means, a secondary probability distribution determining means, a probability relationship making means, and a combining means. The primary and secondary radar devices irradiate different types of transmission waves to each other. Each radar device is configured to irradiate a transmission wave to the outside of a vehicle within a predetermined scanning-angle range per predetermined scanning period, and to receive the transmission wave reflected by an object as an obstacle and to detect existence/non-existence and position of the obstacle based on the reflected transmission wave. The primary probability distribution determining means is configured to determine an existence probability distribution of the obstacle to a distance of the transmission wave toward its irradiation direction based on a relationship between an elapsed time counted from the irradiation of the transmission wave by the primary radar device and the strength of the reflected transmission wave. A maximum value in the strength of the reflected transmission wave is used as a maximum probability of position of the obstacle. The existence probability distribution has a range gradually decreased before and after the maximum probability of position of the obstacle. The secondary probability distribution determining means is configured to determine an existence probability distribution of the obstacle to a distance of the transmission wave toward its irradiation direction based on a relationship between an elapsed time counted from the irradiation of the transmission wave by the secondary radar device and the strength of the reflected transmission wave. A maximum value in the strength of the reflected transmission wave is used as a maximum probability of position of the obstacle. The existence probability distribution has a range gradually decreased before and after the maximum probability of position of the obstacle. The probability relationship making means is configured to make a primary existence probability relationship representing a primary probability of existence of the obstacle in a horizontal plane coordinate using a plurality of the existence probability distributions determined by the primary probability distribution determining means based on each transmission wave irradiated throughout the entire of the scanning-angle range, and is configured to make a secondary existence probability relationship representing a secondary probability of existence of the obstacle in a horizontal plane coordinate using a plurality of the existence probability distributions determined by the secondary probability distribution determining means based on each transmission wave irradiated throughout the entire of the scanning-angle range. The combining means is configured to make a combined existence probability relationship by combining the primary existence probability relationship and the secondary existence probability relationship made by the probability relationship making means.

According to the fourth aspect of the present invention, the primary and secondary probability distribution determining means determine the existence probability distributions of the obstacle to a distance of each transmission wave (laser light or ultrasound wave) toward its irradiation direction. A maximum value in the strength of the reflected transmission wave is used as a maximum probability of position of the obstacle. The existence probability distribution has a range gradually decreased before and after the maximum probability of position of the obstacle. Accordingly, even if a difference or error occurs between the position indicated by the maximum probability of the obstacle in the probability distribution and the actual position of the obstacle, the possibility having the probability of zero for the point where the actual obstacle exists becomes low. This can reduce the occurrence of the error detection. Therefore the error recognition such as separation error of the obstacle and association error of the obstacles to be caused by error detection hardly occurs. The probability relationship making means makes the primary existence probability relationship using a plurality of the existence probability distributions determined by the primary probability distribution determining means and further makes the secondary existence probability relationship using a plurality of the existence probability distributions determined by the secondary probability distribution determining means. Those primary and secondary existence probability relationships are made by using the radar devices of different types to each other. Those radar devices easily detect different types of obstacles. The use of the combined existence probability relationship obtained by combining the primary and secondary existence probability relationships by the combining means provides that the probability of existence of the actual obstacle becomes hardly zero when compared with the case using each of the primary and secondary existence probability relationships. Accordingly, the occurrence of the error detection of the obstacle using the combined existence probability relationship can be further reduced when compared with the case using only one of the primary and secondary existence probability relationships.

It is preferred that the configuration of the obstacle detection system of the third aspect of the present invention has the two types of the radar devices like the fourth aspect of the present invention. An obstacle detection system according to a fifth aspect of the present invention has the two types of the radar devices and the combined existence probability relationship in the fourth aspect of the present invention as the primary existence probability relationship in addition to the configuration of the third aspect of the present invention.

That is, in accordance with the fifth aspect of the present invention, there is provided the obstacle detection system for a vehicle having the following configuration. The radar device has a primary radar device and a secondary radar device which irradiate different types of transmission waves to each other. The probability distribution determining means has a primary probability distribution determining means and a secondary probability distribution determining means. The primary probability distribution determining means is configured to determine an existence probability distribution of the obstacle to a distance of the transmission wave toward its irradiation direction based on a relationship between an elapsed time counted from the irradiation of the transmission wave by the primary radar device and the strength of the reflected transmission wave, and a maximum value in the strength of the reflected transmission wave is used as a maximum probability of position of the obstacle, and the existence probability distribution has a range gradually decreased before and after the maximum probability of position of the obstacle. The secondary probability distribution determining means is configured to determine an existence probability distribution of the obstacle to a distance of the transmission wave toward its irradiation direction based on a relationship between an elapsed time counted from the irradiation of the transmission wave by the secondary radar device and the strength of the reflected transmission wave, and a maximum value in the strength of the reflected transmission wave being used as a maximum probability of position of the obstacle, and the existence probability distribution having a range gradually decreased before and after the maximum probability of position of the obstacle. The primary probability relationship making means is configured to make a 1-1 existence probability relationship representing a probability of existence of the obstacle in a horizontal plane coordinate using a plurality of the existence probability distributions determined by the primary probability distribution determining means based on the transmission wave irradiated throughout the entire of the scanning-angle range, and is also configured to make a 1-2 existence probability relationship representing a probability of existence of the obstacle in a horizontal plane coordinate using a plurality of the existence probability distributions determined by the secondary probability distribution determining means based on the transmission wave irradiated throughout the entire of the scanning-angle range.

According to the fifth aspect of the present invention, because the primary existence probability relationship is made by combining the 1-1 existence probability relationship and the 1-2 existence probability relationship made by using the two types of the radar devices, it is possible to increase the accuracy of the probability of existence of the obstacle. In addition, because the secondary existence probability relationship is made based on the combined existence probability relationship which is made based on the primary existence probability relationship, the final combined existence probability relationship is made by combining the primary and secondary existence probability relationships. This can further reduce the occurrence of the error detection.

In accordance with a sixth aspect of the present invention, it is preferred that the primary existence probability relationship and the secondary existence probability relationship are expressed in an absolute coordinate system. The use of the absolute coordinate system is free from movement of the vehicle, namely, can eliminate any influence on movement of the vehicle.

BRIEF DESCRIPTION OF THE DRAWINGS

A preferred, non-limiting embodiment of the present invention will be described by way of example with reference to the accompanying drawings, in which.

DETAILED DESCRIPTION OF THE PREFERRED EMBODIMENTS

Figure 1:
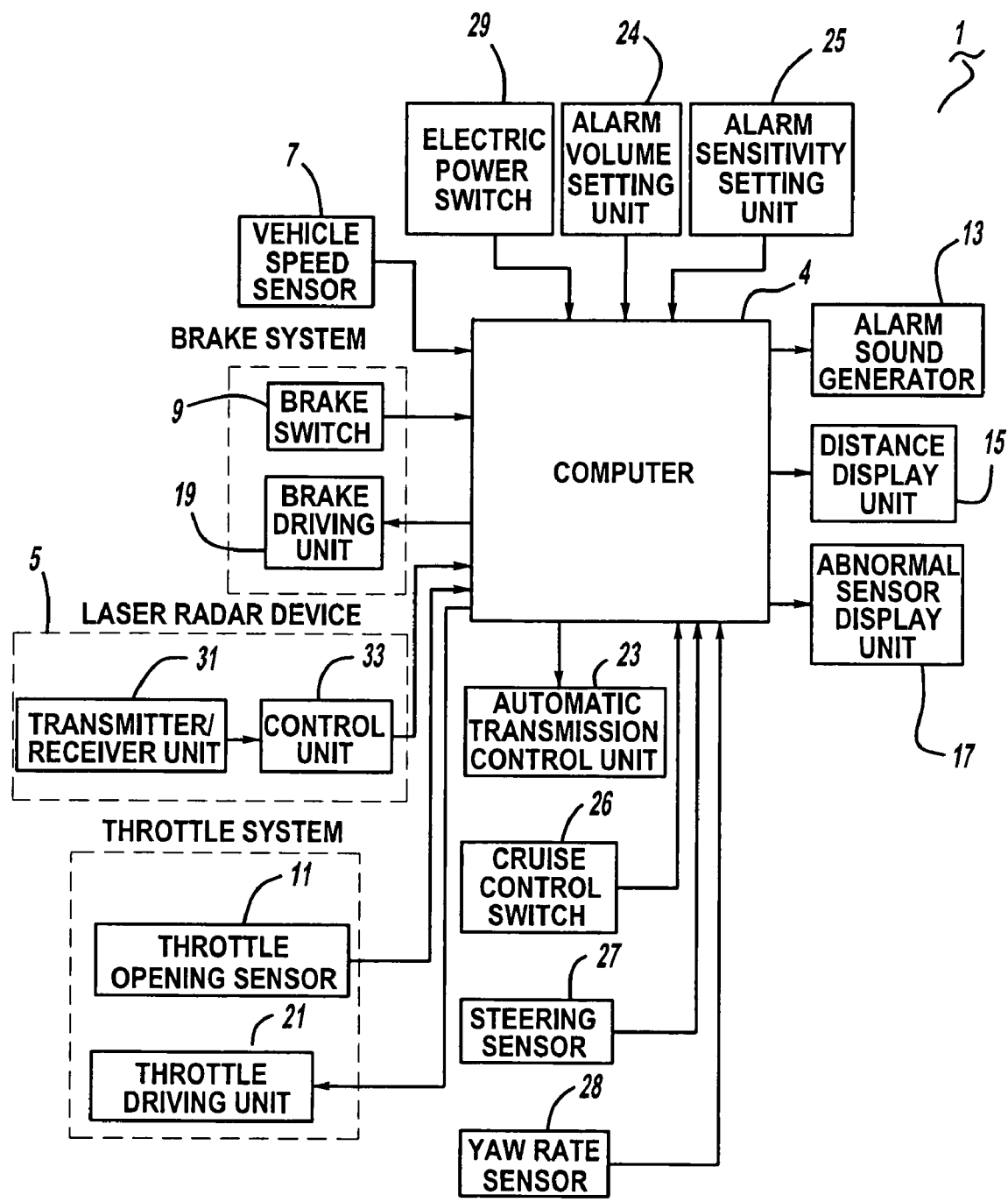
FIG. 1 is a block diagram mainly showing a configuration of a vehicle control system equipped with an obstacle detection system for a vehicle according to a first embodiment of the present invention.

Hereinafter, various embodiments of the present invention will be described with reference to the accompanying drawings. In the following description of the various embodiments, like reference characters or numerals designate like or equivalent component parts throughout the several diagrams.

First Embodiment

A description will be given of an obstacle detection system for a vehicle according to a first embodiment of the present invention with reference to FIG. 1 to FIG. 8.

FIG. 1 is a block diagram showing a configuration of a vehicle control system 1 equipped with the obstacle detection system for a vehicle according to the first embodiment. FIG. 1 also shows various types of peripheral units to be controlled by the obstacle detection system.

The vehicle control system is composed mainly of a computer 4. The computer 4 has a microcomputer as a main component, an input and output interface (I/O interface), and various types of driving circuits and detection circuits. Because the configurations of those circuits are well known, the explanation for them is omitted here.

The computer 4 inputs various kinds of detection data items detected by and transferred from object sensors such as a laser radar device 5, a vehicle speed sensor 7, a brake switch 9 and a throttle opening sensor 11.

The computer 4 generates and transfers predetermined control signals to an alarm sound generator 13, a distance display unit 15, an abnormal sensor display unit 17, a brake driving unit 19, a throttle driving unit 21, and an automatic transmission control unit 23.

The computer 4 further is equipped with an alarm volume setting unit 24, an alarm sensitivity setting unit 25, a cruise control switch 26, a steering sensor 27, and a yaw rate sensor 28.

Through the alarm volume setting unit 24, the alarm sound volume is controlled. The alarm sensitivity setting unit 25 sets a sensitivity to be used in an alarm judgment process which will be described later. Through the steering sensor 27 and the yaw rate sensor 28, operation amount for a steering wheel (omitted from drawings) is detected.

The computer 4 is further equipped with an electric power switch 29. When switching on the electric power switch 29, the computer 4 initiates the execution of the predetermined processes.

The laser radar device 5 is equipped with a transmitter/receiver unit 31, and a control unit 33. The control unit 33 so controls the transmitter/receiver unit 31 that the transmitter/receiver unit 31 irregularly scans a front area of a vehicle, in other words, irregularly outputs the laser light around the center of its optical axis (or its center axis) toward the front area of a vehicle within a predetermined range of angle in the vehicle's width direction.

The control unit 33 is capable of temporarily storing strength change data for the detected signal as a reflected wave to an elapsed time counted from the irradiation time when the transmission wave as a laser light is irradiated. The changed strength of the reflected wave described above will be also referred to as "detected strength change data".

The control unit 33 outputs the detected strength change data to the computer 4. It is acceptable to use the laser light whose beam has an approximate circular shape, an elliptic shape, a rectangular shape and other shapes.

The above relationship such as the detected strength change data of the reflected wave and its corresponding scanning angle θ/ (scan direction) are temporarily stored in a memory.

The computer 4 described above performs an alarm judgment process of informing warning or sound the alarm when the obstacle exists in the predetermined alarm area for a predetermined time length. For example, a forward vehicle, a parking vehicle which moving in the front area of ego vehicle, a parking vehicle, and the like are recognized as obstacles.

The computer 4 outputs various kinds of driving signals to the brake driving unit 19, the throttle driving unit 21 and the automatic transmission control unit 23 in order to perform cruise control. In the cruise control, the vehicle speed is controlled according to the vehicle speed and the like of the relevant vehicle. The computer 4 performs the alarm judgment process and the cruise control simultaneously.

Figure 2:
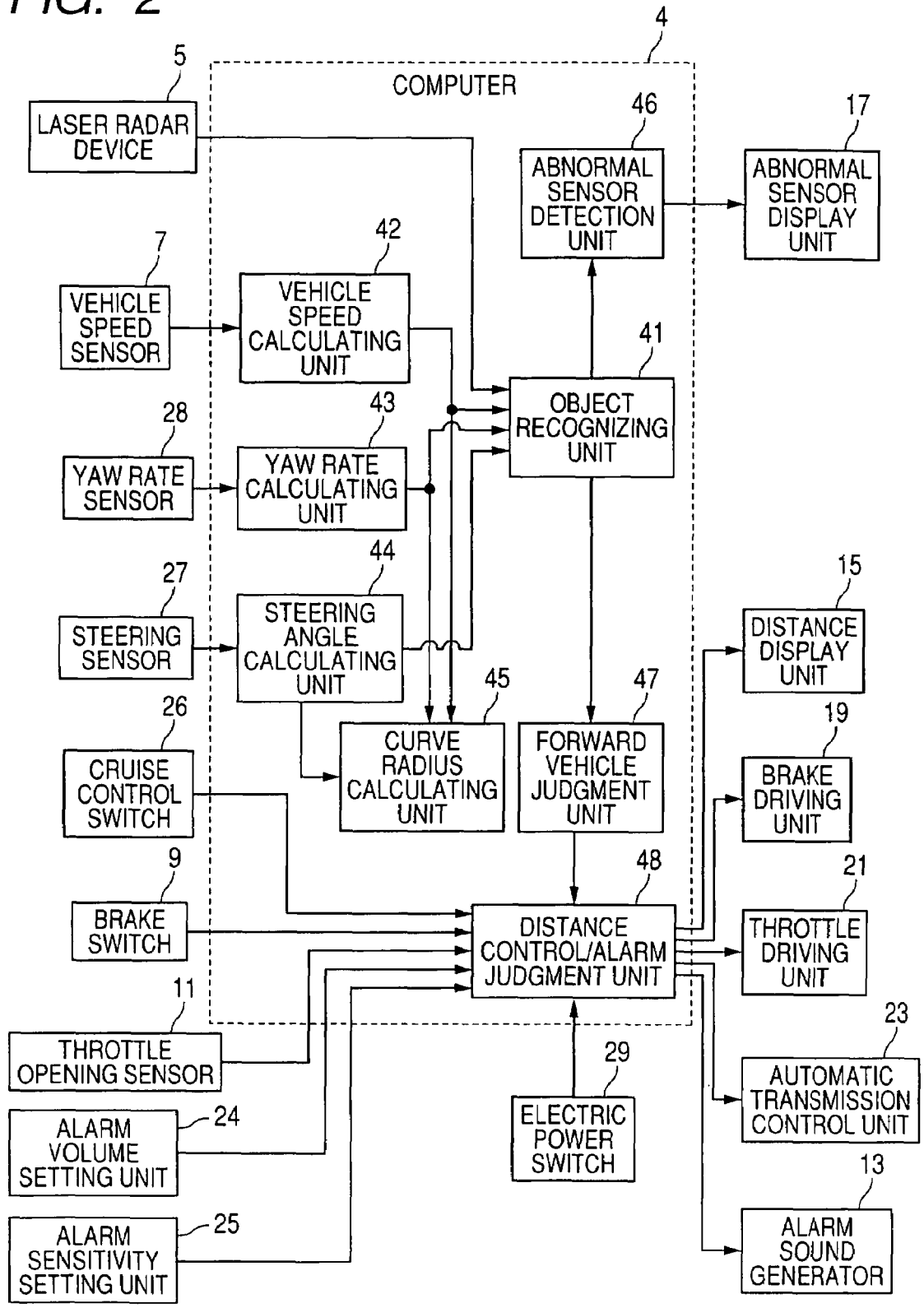
FIG. 2 is a block diagram mainly showing a configuration of a computer incorporated in the vehicle control system equipped with the obstacle detection system, and also showing those peripheral units to be controlled by the computer.

FIG. 2 is a block diagram showing a configuration of control units in the computer 4 in the vehicle control system equipped with the obstacle detection system according to the first embodiment. FIG. 2 also shows various peripheral units to be controlled by the computer 4.

The control unit 33 in the laser radar device 5 outputs the detected data items to an object recognizing unit 41 in the computer 4.

A vehicle speed calculating unit 42 sequentially calculates a vehicle speed based on a vehicle speed signal transferred from the vehicle speed sensor 7. A yaw rate calculating unit 43 sequentially calculates a yaw rate based on a yaw rate signal transferred from the yaw rate sensor 28. A steering angle calculating unit 44 sequentially calculates a steering angle based on a steering angle signal transferred from the steering sensor 27.

The vehicle speed calculating unit 42, the yaw rate calculating unit 43 and the steering angle calculating unit 44 output calculated results to a curve radius calculating unit 45 and the object recognizing unit 41.

The curve radius calculating unit 45 calculates a curve radius R (or a radius of curvature R) based on the vehicle speed, the yaw rate, and the steering angle calculated by the vehicle speed calculating unit 42, the yaw rate calculating unit 43 and the steering angle calculating unit 44, respectively.

The object recognizing unit 41 transforms the data items transferred from the laser radar device 5 into data items in an absolute coordinate system based on the vehicle speed calculated by the vehicle speed calculating unit 42, the yaw rate calculated by the yaw rate calculating unit 43 and the steering angle calculated by the steering angle calculating unit 44. The object recognizing unit 41 then recognizes an obstacle object (which will be referred to as "obstacle" or "object" in short) which exists in the front of the vehicle based on those transformed data items. The object recognizing unit 41 further determines the kind of, the size of, and the speed of the target object. The processes of the object recognizing unit 41 will be described later in detail.

An abnormal sensor detection unit 46 detects whether the data items that have been transformed from the detected data items into the absolute coordinate system by the object recognizing unit 41 fall into abnormal state or not. When the detection result indicates those data items are in abnormal, the abnormal sensor detection unit 46 informs the abnormal state of the sensor through the abnormal sensor display unit 17.

A relevant vehicle judgment unit 47 selects which one of the recognized objects is the target vehicle based on the curve radius calculated by the curve radius calculating unit 45 and the various data items regarding its kind, its size and the speed detected by the object recognizing unit 41. The relevant vehicle judgment unit 47 then calculates a distance Z between vehicles, namely, the distance between the relevant vehicle and the ego vehicle. The relevant vehicle judgment unit 47 further calculates a relative speed Vz between the relevant vehicle and ego vehicle.

A distance control/alarm judgment unit 48 generates a control signal for adjusting the distance Z based on the following distance Z and the relative speed Vx calculated by the relevant vehicle judgment unit 47 in addition to ego vehicle speed Vn, the setting state of the cruise control switch 26 and the state of the brake switch 9. The distance control/alarm judgment unit 48 then outputs control signals to the brake driving unit 19, the throttle driving unit 21 and the automatic transmission control unit 23.

The distance control/alarm judgment unit 48 further generates a display signal based on those data items and then outputs the display signal to the distance display unit 45 in order to inform the condition of the vehicle to the driver of ego vehicle.

The distance control/alarm judgment unit 48 judges the condition of the vehicle based on ego vehicle speed, the relative speed between the relevant vehicle speed and ego vehicle speed, an accelerated speed of the relevant vehicle, the position of the object, the width of the object, and the output of the brake switch 9, and the opening state of the throttle opening sensor 11, and the output value from the alarm sensitivity setting unit 25.

When the judgment result indicates the alarming condition, the distance control/alarm judgment unit 48 judges whether or not the alarm is output to the driver. On the contrary, when the judgment result indicates the continuation of the cruise operation, the distance control/alarm judgment unit 48 determines the contents to be used for controlling the vehicle speed.

As a result, on judging the alarm state, the alarm sound is generated by the alarm sound generator 13 with a sound volume based on the data set in the alarm volume setting unit 24. On judging the cruise state, the distance control/alarm judgment unit 48 outputs control signals to the brake driving unit 19, the throttle driving unit 21, and the automatic transmission control unit 23 in order to perform the necessary control of those units.

Next, a description will now be given of the object recognizing process performed by the object recognizing unit 41 with reference to FIG. 3.

Figure 3:
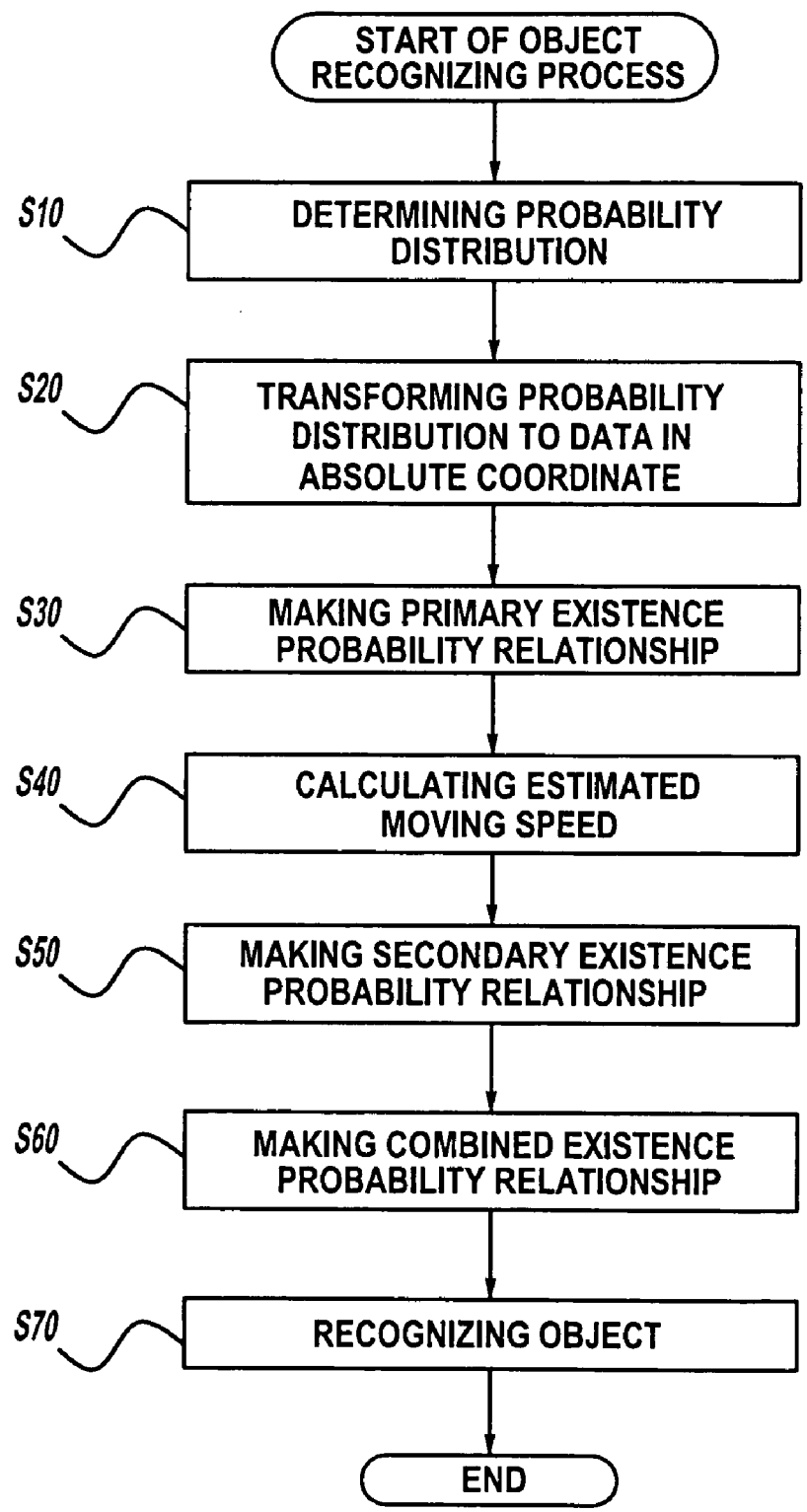
FIG. 3 is a flow chart showing the process of recognizing an object by an object recognizing unit shown in FIG. 2.

FIG. 3 is a flow chart showing the process of recognizing objects such as a forward vehicle and obstacles by the object recognizing unit 41 shown in FIG. 2. FIG. 3 shows only the process per scanning of the transmission wave as the laser light. That is, the process shown in FIG. 3 is continuously repeated.

The process shown in step S10 corresponds to the process performed by a probability distribution determining means. A maximum peak value in the strength signals detected by and supplied from the laser radar device 5 every scanning angle θ is used as the maximum probability value of existence or position of the obstacle as the target object. Those strength signals detected by the laser radar device 5 are also referred as "the detected strength change data items" because those data items are changed according to the scanning angle θ. The detected strength change data items are transformed into data items of the existence probability distribution having a range where the data items are gradually decreased from the maximum probability value (toward the front area and toward the rear area shown in FIG. 4A). The detected strength change data items represent the change of the detected signal strength of the reflected wave to the elapsed time after the transmission wave is irradiated toward the front of ego vehicle. Through the existence probability distribution, each elapsed time is transformed to a distance (see FIG. 4B) in one-to-one corresponding. In step S10, such a distance is the data in a relative coordinate system, where the position of the transmitter/receiver unit 31 in the laser radar device 5 mounted on ego vehicle is the origin of the coordinate system. That is, the probability distribution obtained in step S10 shows the probability of existence (or position) of the obstacle to the distance counted from the position of the transmitter/receiver unit 31 in the laser radar device 5.

Figure 4A:
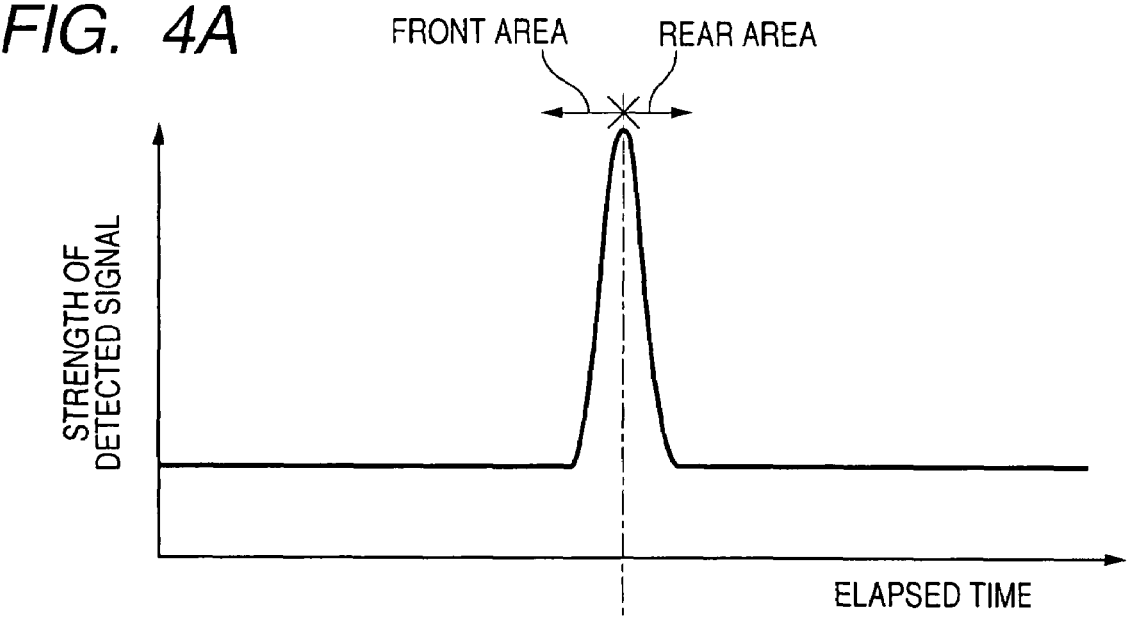
FIG. 4A shows an example of strength changing data detected by and supplied form a laser radar device shown in FIG. 1.
Figure 4B:
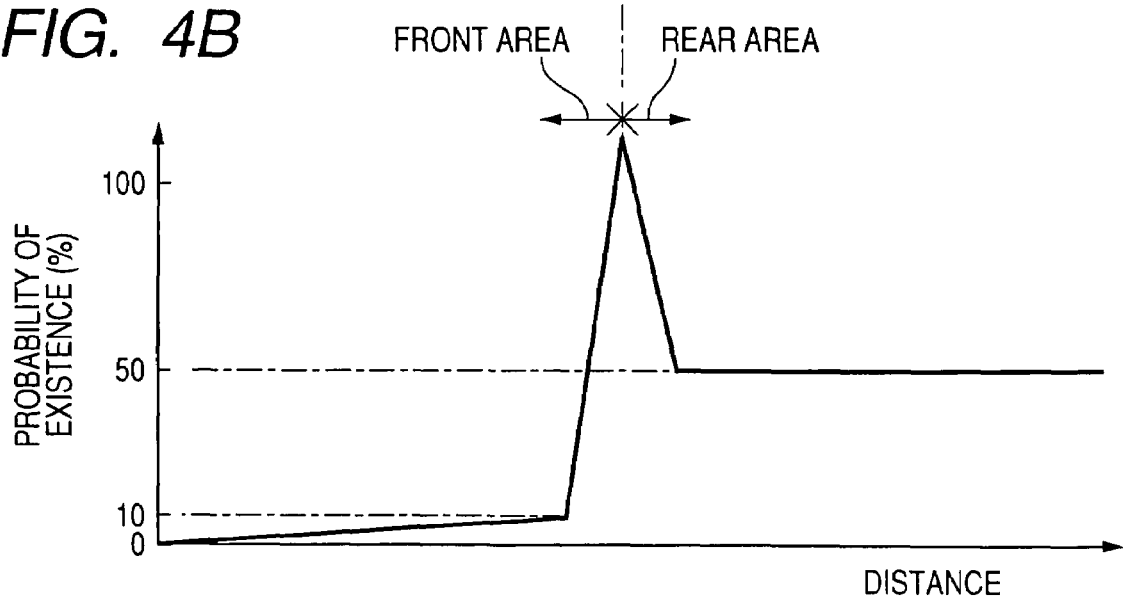
FIG. 4B shows a probability distribution obtained by processing the strength changing data in step S10 shown in FIG. 4A.

FIG. 4A is an example showing the change of the strength of the detected signal or data item supplied from the laser radar device 5. FIG. 4B shows the probability distribution obtained in step S10 in which the detected strength change data items shown in FIG. 4A are processed.

A description will now be given of the probability distribution of the obstacle with reference to FIG. 4A and FIG. 4B.

The peak value in the probability distribution described above (obtained in step S10) is set as a predetermined probability value near 100% (for example, 90%). The range in which the probability of existence of the obstacle (or the probability of position of the obstacle) is gradually deceased is set in advance based on experiment. For example, the range is from a standard deviation "σ" to two or three times of the standard deviation.

FIG. 4B shows the values of the probability of existence of the obstacle, in which the values of the probability are decreased from the peak value toward the front area from the peak value, and also toward the rear area from the peak value along both straight lines shown in FIG. 4B. By the way, it is acceptable to decrease the values of the probability along a curve line or a broken line instead of the straight line.

The probability of existence of the obstacle after the peak value (toward the rear area, namely, toward the increasing distance) is set to a constant value of 50% of the peak value. This means that another obstacle which is hiding behind the target obstacle and the target obstacle are considered as the same obstacle, namely, the probability of existence/non-existence of another obstacle is set to be a same value, because it is difficult to recognize the existence of another obstacle which is hiding behind the target obstacle and the transmission wave is reflected only by the target obstacle corresponding to the peak value of the probability.

Further, the probability of existence before the peak value (toward the front area, namely, toward the decreasing distance) is decreased along a straight line until a predetermined lower limit value of the probability of existence. For example, the predetermined lower limit value is the value of 10% of the peak value shown in FIG. 4B. The probability from the lower limit (10%) to zero is decreased along another straight line. That is, there is no range taking the probability of zero before the peak value. This means that it is necessary to consider the existence of obstacle such as a glass plate through which the laser light as the transmission wave penetrates. It is acceptable to set the probability of existence of the obstacle to the constant value of 10% from the origin to the distance of 10%.

It is also acceptable to use the value of 30% of the peak value of the probability of existence instead of the constant value of 50% after the peak value (namely, toward the rear area or toward the increasing distance) so far as it takes a larger value than the lower limit value (for example, 10% of the peak value shown in FIG. 4B).

In following step S20, the probability distribution obtained in step S10 is transformed to the absolute coordinate system. In a concrete example, the vehicle position in the absolute coordinate system is sequentially updated and the moving distance and the moving direction of the vehicle from those calculated in the previous cycle are calculated based on the vehicle speed, the yaw rate, and the steering angle sequentially calculated by the vehicle speed calculating unit 42, the yaw rate calculating unit 43, and the steering angle calculating unit 44, respectively. The coordinate system of the probability obtained in step S10 is transformed to the absolute coordinate system based on those calculated values. In step S10, the probability distribution is obtained per scanning angle θ, and all of the probability distribution obtained in step S10 are transformed to the absolute coordinate system.

The process performed in step S30 corresponds to the process of a primary probability relationship making means. In step S30, all of the probability distributions obtained in step S20 are combined and a primary existence probability relationship representing the probability of existence of the obstacle in a horizontal plane coordinate is made.

Figure 5:
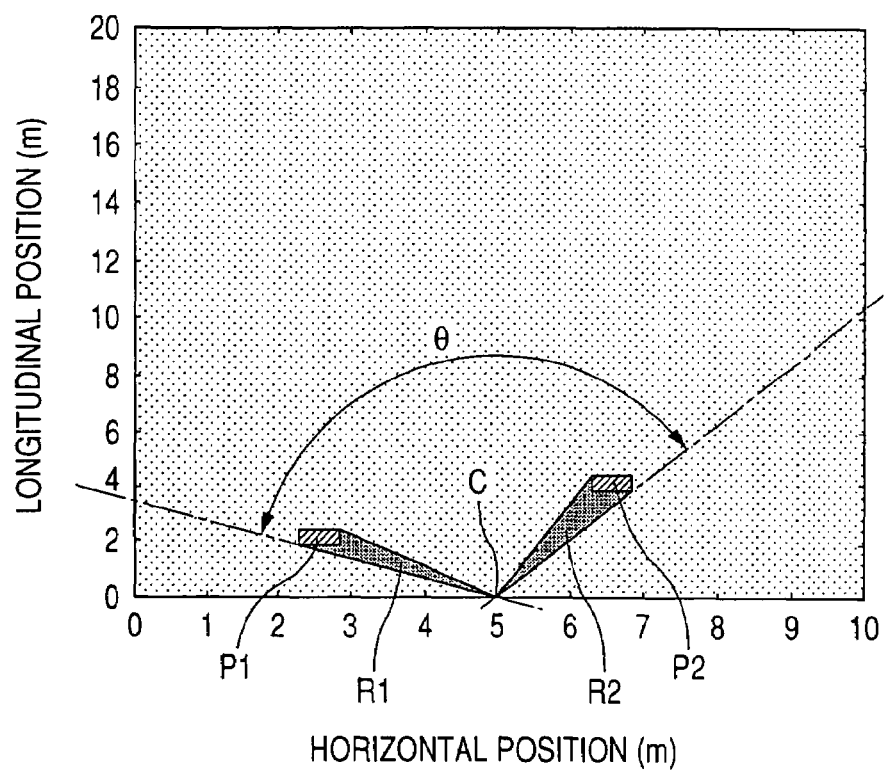
FIG. 5 shows an example of a primary existence probability relationship obtained in step S30 shown in FIG. 3.

The primary existence probability relationship made by combining all of the probability distributions obtained in step S20 becomes a plane of a fan-shape whose center corresponds to the position of ego vehicle. FIG. 5 shows an example of the primary existence probability relationship obtained in step S30 shown in FIG. 3, from which a part of the fan-shape plane is eliminated.

The example shown in FIG. 5 has two peaks areas P1 and P2 of the existence probability of the obstacle. One peak area P1 has the horizontal position of approximate 2.6 m and the vertical position of approximate 2.0 m. Another peak area P2 has the lateral position of approximate 6.5 m and the vertical position of approximate 4.0 m.

The peak areas P1 and P2 correspond to the areas which have been explained previously with reference to FIG. 4B, where the probability of existence of the obstacle is gradually decreased.

The before areas R1 and R2 through which the peak areas P1 and P2 are connected to the position C of the vehicle are the areas in which the probability of existence of the obstacle is decreased from 10% to zero % along a straight line. Because the transmission wave, namely, the laser light is not scanned in the area outside of the scanning angle θ, such an outside area has the probability of existence of the obstacle of 50%, namely, the probability of existence and the probability existence/non-existence of an obstacle is same.

It is so set that the area other than the above-explained area within the scanning angle θ takes the probability of existences of the obstacle of 50%.

Those areas are difficult to recognize the existence of another obstacle other than the target obstacle because another obstacle is hiding behind the target obstacle, and the area in which it is difficult to recognize the existence of an obstacle because the transmission wave is not reflected by the obstacle.

The process performed in step S40 corresponds to the process of a speed calculating means. Step S40 performs the estimation or the calculation of the moving speed using a manner similar to a related-art manner "optical flow manner" well known in an image processing field. Such a manner of calculating the estimated moving speed performed in step S40 uses a combined existence probability relationship obtained in step S60 at the previous cycle and a combined existence probability relationship obtained in step S60 at the cycle two times before.

The calculation of the estimated moving speed is performed throughout the entire range of the plane coordinate in the combined existence probability per predetermined time interval (for example, per 10 cm).

In a concrete example of performing the estimation or calculation of the moving speed at the position of the vehicle, the probability of the position of the vehicle in the combined probability of existence obtained two times before is firstly recognized, and the estimated moving distance of the object is determined based on the probability of the position, which is the same as (or relative to) the probability obtained two times before, is in the combined existence probability obtained in the previous cycle.

The estimated moving speed is calculated based on the moving distance obtained and the elapsed time counted from the execution of step S60 performed two times before to the execution of step S60 performed in the previous cycle.

Figure 6:
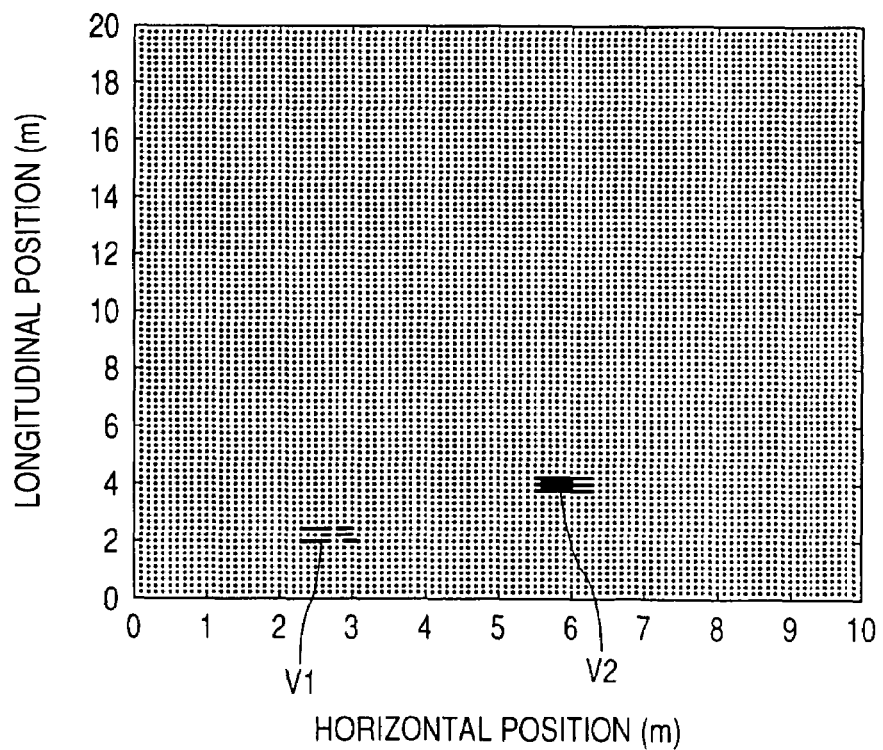
FIG. 6 shows an example of all of estimated moving speeds calculated in step S40 shown in FIG. 3.

FIG. 6 shows an example of all of the estimated moving speeds calculated in step S40 shown in FIG. 3. The example of FIG. 6 shows the vectors V1 and V2 having a length in the area where the two peak areas P1 and P2 (having a high probability of existence of the obstacle) shown in FIG. 5 are formed. This indicates that the objects in the peak areas P1 and P2 are currently moving.

In FIG. 6, all of estimated moving speeds in the area other than the area corresponding to each of the peak areas P1 and P2 shown in FIG. 5 are shown by points (namely, its speed is zero). This means that no object moves in the area which does not correspond to the peak areas P1 and P2.

The process performed in following step S50 corresponds to the process performed by a secondary probability relationship making means.

In step S50, the secondary existence probability relationship is made by shifting the existence probability corresponding to the horizontal plane coordinate in the combined existence probability relationship obtained by step S60 in the previous cycle by the estimated moving speed calculated in step S40 performed in the current cycle.

When the estimated moving speed is calculated based on the shift of the same or relative probability from the calculation cycle two times before to the previous calculation cycle, there is a possibility of occurring the moving of plural objects. In this case, one object having the maximum probability is used for calculating the estimated moving speed.

There is another case where it is difficult to determine the probability of existence of an object in a different coordinate because no object moves and the probability of existence of the object obtained in the previous cycle is shifted into this different coordinate. In this case, the lowest probability, for example, 10% is set as the probability of existence of the object in this different coordinate, because the existence of any object cannot be completely denied.

Figure 7:
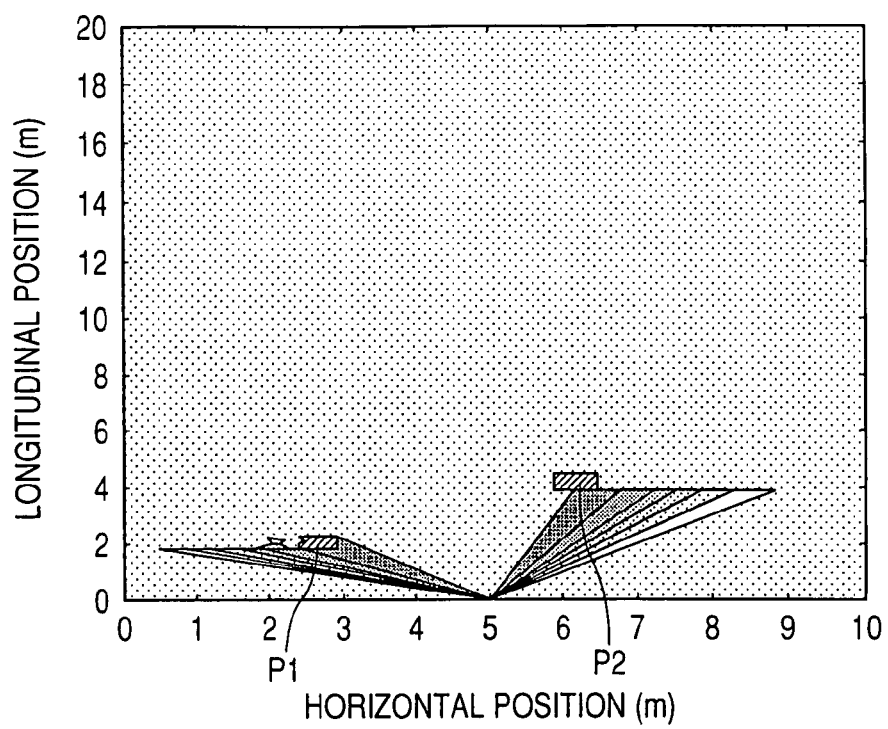
FIG. 7 shows an example of a secondary existence probability relationship obtained in step S50 shown in FIG. 3.

FIG. 7 shows an example of the secondary existence probability relationship obtained in step S50 shown in FIG. 3.

The secondary existence probability relationship means the estimation of the current existence probability relationship in the current cycle obtained from the combined probability relationships obtained in the previous cycle and the cycle two times before.

In the case shown in FIG. 7, it is estimated to move the peak area P2 based on the calculation of the vector V2 which indicates the moving of a relatively large distance in FIG. 6.

FIG. 7 shows a triangle area whose probability of existence of the object is increased according to the going away from ego vehicle.

The process performed in step S60 corresponds to the process performed by a combining means. In step S60, the combined existence probability relationship is calculated by multiplying the primary existence probability relationship obtained in step S30 and the secondary existence probability relationship obtained in step S50 in same coordinates.

Figure 8:
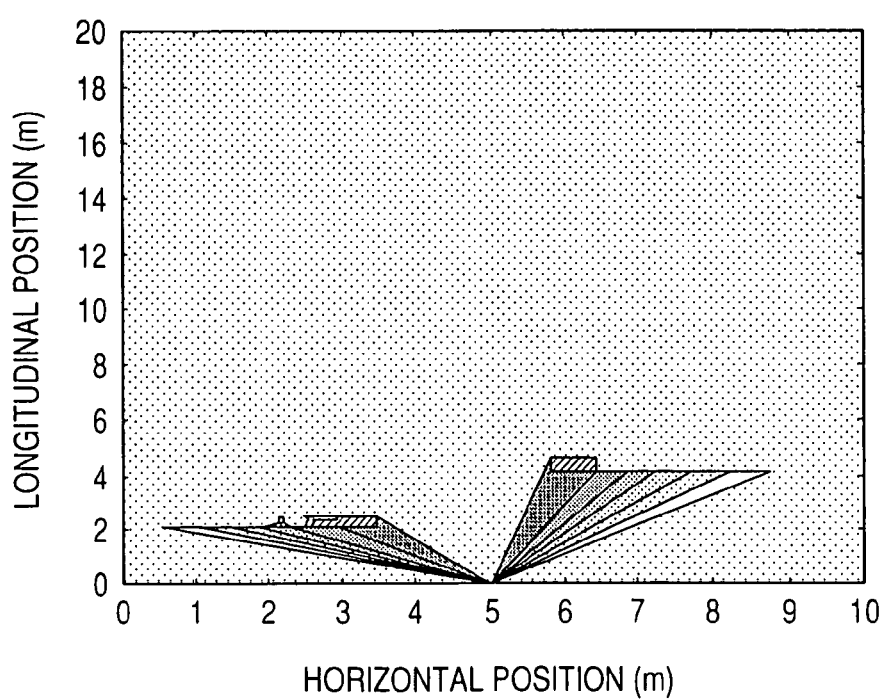
FIG. 8 is an example of a combined existence relationship obtained in step S60 shown in FIG. 3.

FIG. 8 shows an example of the combined existence probability relationship obtained in step S60 shown in FIG. 3.

The relationship shown in FIG. 8 is obtained by multiplying the primary existence probability relationship shown in FIG. 5 and the secondary existence probability relationship shown in FIG. 7 per same coordinate, respectively.

The value of the existence probability is generally decreased according to the increase of the number of cycles of the multiplying. In order to avoid the decreasing of the probability of existence, it is possible to perform the normalization every execution of the multiplication.

In the object detecting process performed in step S70 according to the first embodiment, the existence probability is relatively evaluated and the absolute value of the probability of existence does not affect the accuracy of detecting the object. The first embodiment of the present invention does not perform such normalization.

The process performed in step S70 determines the maximum probability of existence in the combined existence probability relationship calculated in step S60, and determined the coordinate of more than a predetermined probability (for example, 70% or more of the maximum probability) where the object exists. In step S70, the size and shape of the object are determined based on the determined coordinate. The kind of the object is recognized based on the size and shape of the object. In addition, the moving speed of the object is determined based on the moving distance of the object. The information such as the size, the shape, the kind, the moving speed of the object determined above are output to the relevant vehicle judgment unit 47.

According to the first embodiment as describe above in detail, the existence probability distribution (shown in FIG. 4B) of the obstacle to the distance in the irradiation direction of the transmission wave is determined based on the detected strength change data (shown in FIG. 4A) supplied every scanning angle θ from the laser radar device 5.

This probability distribution has the peak value of the detected signal strength of the reflected wave as the maximum probability, and has the area in which the detected signal strength is gradually decreased after and before the peak value. Accordingly, even if a difference or error occurs between the maximum probability position of the obstacle in the probability distribution and the actual position of the obstacle, the possibility having the probability of zero for the point where the actual obstacle exists becomes low. This can reduce the occurrence of the error detection. Therefore the error recognition such as separation error and association error to be caused by error detection hardly occurs.

In step S30, the primary existence probability relationship (shown in FIG. 5) is made based on the probability distribution described above. In step S60, the most recent combined existence probability relationship (shown in FIG. 8) is made by combining the primary existence probability relationship and the secondary existence probability relationship (shown in FIG. 7), where the secondary existence probability relationship is estimated based on the primary existence probability relationship and the combined existence probability relationship obtained in the previous cycle which are multiplied together per same coordinate. Because the present invention performs the object recognition process using the above combined existence probability relationship, it is possible to further reduce occurrence of the error recognition of the obstacle when compared with the obstacle recognition process only using the primary existence probability relationship.

Second Embodiment

A description will now be given of an obstacle detection system for a vehicle according to a second embodiment of the present disclosure with reference to FIG. 9 to FIG. 10. In the following explanation, the same components of the obstacle detection system between the first embodiment and the second embodiment will be designated by the same reference numbers. The explanation of the same components is omitted here for brevity.

Figure 9:
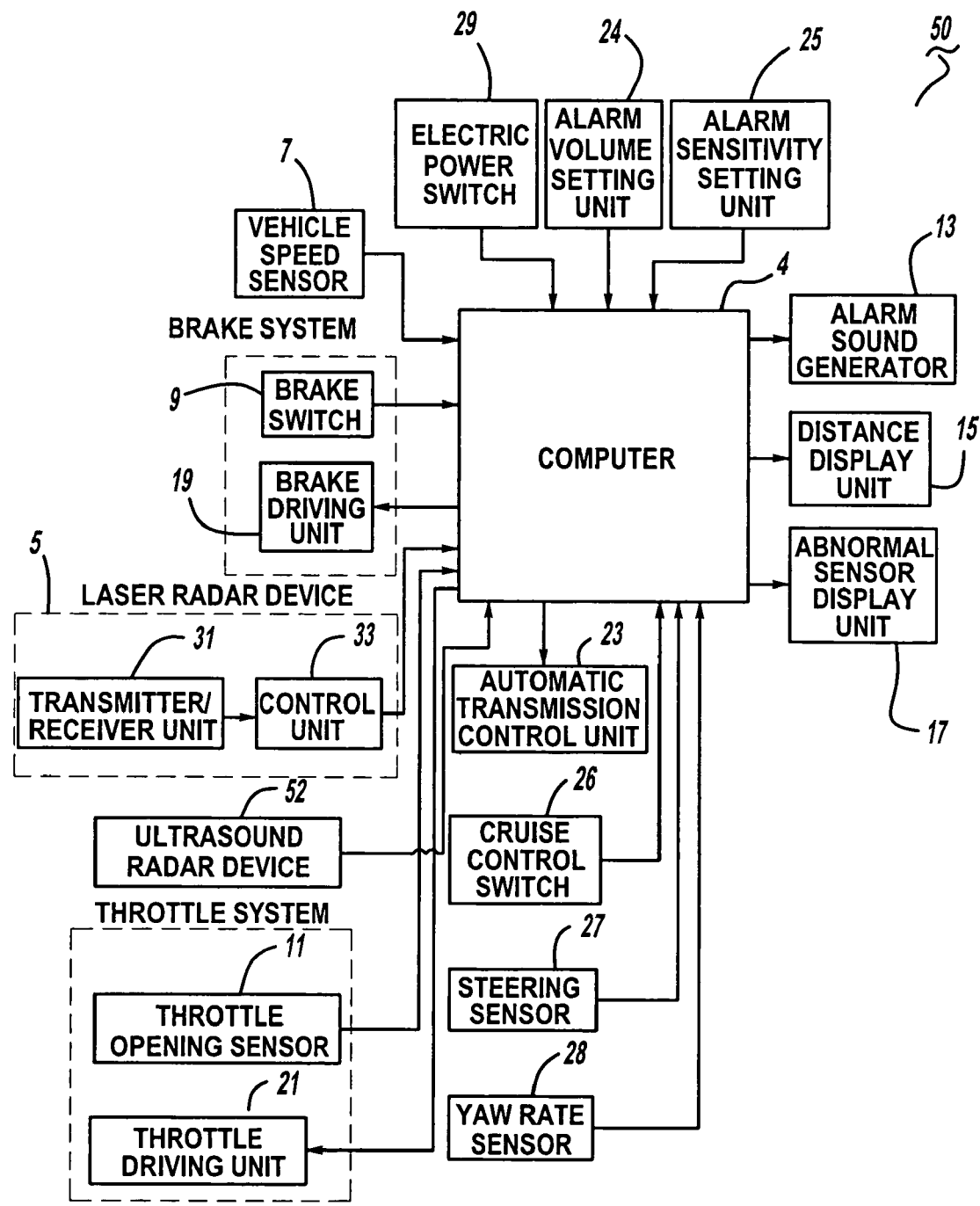
FIG. 9 is a block diagram mainly showing a configuration of a vehicle control system equipped with an obstacle detection system for a vehicle according to a second embodiment of the present invention.

FIG. 9 is a block diagram showing a configuration of the vehicle control system 50 equipped with the function of the obstacle detection system for a vehicle according to the second embodiment. FIG. 9 also shows peripheral units to be controlled by the obstacle detection system.

The vehicle control system 50 is further equipped with an ultrasound radar device 52 in addition to the configuration of the first embodiment. The ultrasound radar device 52 is equipped with a transmitter/receiver unit and a control unit, like the configuration of the laser radar device 5 shown in FIG. 1. The transmitter/receiver unit and the control unit in the ultrasound radar device 52 are omitted from FIG. 9 and FIG. 10.

Like the operation of the laser radar device 5 in the first embodiment, the ultrasound radar device 52 irradiates the transmission wave (as ultrasound wave) toward the front of ego vehicle with a scanning angle θ, and detects the reflected wave reflected by the obstacle that exists in the range of scanning angle θ.

The ultrasound radar device 52 outputs the detected strength change data items corresponding to the reflected wave to the computer 4. This operation of the ultrasound radar device 52 is same as the operation of the laser radar device 5 which has been explained in the first embodiment.

Figure 10:
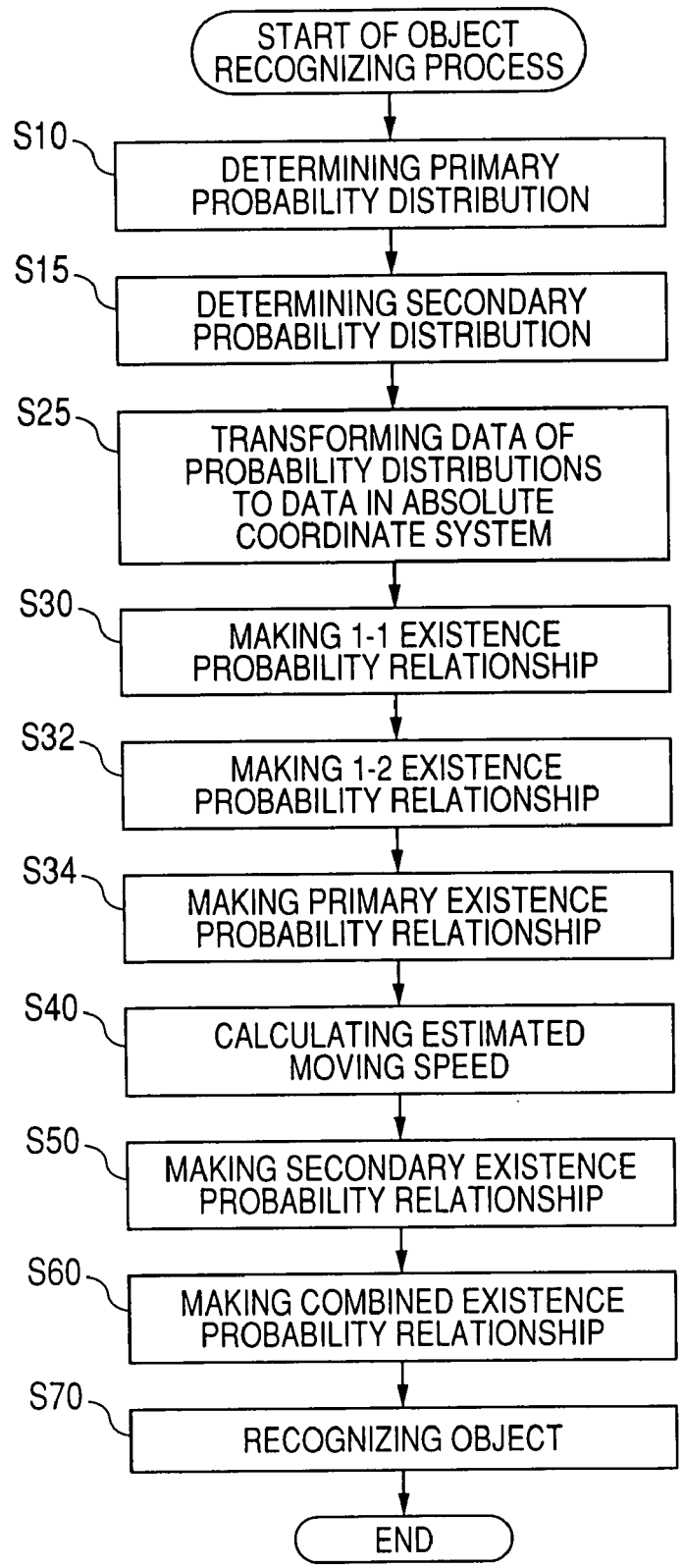
FIG. 10 is a flow chart showing a process of recognizing an object by an object recognizing unit in a computer shown in FIG. 9.

FIG. 10 is a flow chart showing the process of recognizing the object as an obstacle by the object recognizing unit 41 in the computer 4. The object recognizing unit 41 is omitted from FIG. 9.

The same steps in FIG. 3 and FIG. 10 will be designated by the same characters such as S10, S30, and S40 to S70. In other words, the process of the first embodiment shown in FIG. 3 does not have steps S15, S25, S32, and S34 in the second embodiment.

In step S15, like step S10, the detected strength change data supplied from the ultrasound radar device 52 per scanning angle θ is transformed to data in the secondary probability distribution.

The process performed in step S15 corresponds to the process performed by the secondary probability distribution determining means.

In the second embodiment, the probability distribution obtained by step S15 will be referred to as "the secondary probability distribution" and the probability distribution obtained by step 510 will be referred to as "the primary probability distribution" in order to distinguish them to each other. The process performed in step S10 corresponds to the process performed by the primary probability distribution determining means.

Like step S20 shown in FIG. 3, in following step S25 shown in FIG. 10, the data items in the primary probability distribution and the secondary probability distribution determined in step S10 and S15 are transformed to data items in the absolute coordinate.

Like step S30, in step S32, the existence probability relationship representing the probability of existence of the obstacle in a horizontal plane coordinate is obtained by combining all of the secondary probability distributions determined in step S15 and then transformed into the absolute coordinate in step S25. In the second embodiment, this existence probability relationship obtained in step S32 is referred to as "a 1-2 existence probability relationship". In order to distinguish this 1-2 existence probability relationship from the existence probability relationship obtained in step S30, the existence probability relationship obtained in step S30 will be referred to as "a-1 existence probability relationship".

In step S34, the 1-1 existence probability relationship obtained in step S30 and the 1-2 existence probability relationship obtained in step S32 are combined together, like step S60 shown in FIG. 3. The combined relationship obtained in step S34 is referred to as "the primary existence probability relationship".

The operation flow forwards to step S40. The step S40 and the remaining steps such as S50 to S70 are the same of those in the first embodiment shown in FIG. 3.

In the manner of the second embodiment, the processes performed in steps S30, S32, and S34 correspond to the process performed by the primary probability relationship making means.

According to the second embodiment of the present invention, the primary existence probability relationship is made (in step S34) by combining the 1-1 existence probability relationship and the 1-2 existence probability relationship using the detected data items supplied from the two types of the radar devices 5 and 52. It is thereby possible to increase the accuracy of the probability of existence of the obstacle indicated by the primary existence probability relationship. In addition, because the secondary existence probability relationship is based on the combined existence probability relationship made based on the primary existence probability relationship (step S50), the combined existence probability relationship is made in step S60 by combining the primary existence probability relationship and the secondary existence probability relationship. The obstacle detection system for a vehicle according to the second embodiment can further decrease the occurrence of error recognition because the obstacle is detected using the combined existence probability relationship.

The scope of the present invention is not limited by the contents disclosed in both of the first and second embodiments described above. The following modifications are within the scope of the present invention, and it will be appreciated by those skilled in the art that various modifications and alternatives to those details could be developed in light of the overall teachings of the disclosure. For example, although the obstacle detection system according to each of the first and second embodiment uses one or both of the laser radar device 5 and the ultrasound radar device 52, it is possible to use another type of the radar device such as a millimeter radar device, and also to use a object sensor capable of detecting the existence/non-existence of the obstacle and the position of the obstacle by performing image processing for image data pictured by a stereo camera.

Still further, it is possible to detect the existence of an obstacle based on the primary existence probability relationship made by the process of the second embodiment described above.

In the first and second embodiments of the present invention, although the transmission wave such as laser light and ultrasonic wave is scanned in a predetermined direction of one dimension, it is acceptable to scan the transmission wave in a two-dimensional scanning range, namely, to scan the transmission wave in a plane area from the upper direction to the lower direction of the above predetermined direction. This manner can recognize the object in three-dimensions.

Still further, although the transmission wave is scanned toward the front of the vehicle equipped with the obstacle detection device according to the first and second embodiment, it is possible to scan the transmission wave toward the rear direction of the vehicle.

Moreover, although the obstacle detection device according to the first and second embodiment detects the position of the vehicle by using the vehicle speed sensor 7, the yaw rate sensor 28 and the steering sensor 27, it is possible to detect the position of the vehicle based on the information supplied from a GPS sensor in addition to the information from those sensors 7, 28, and 27, or possible to replace the information of one or more those sensors with the information supplied from the GPS sensor. It is also possible to use the obstacle detection sensor according to the present invention when the vehicle stops.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalent thereof.

What is claimed is:

1. An obstacle detection system for a vehicle capable of detecting objects as obstacles existing around a vehicle based on a detection signal irradiated toward and reflected from the objects per predetermined detecting period of scanning the detection signal, comprising:

an object sensor configured to detect existence/non-existence and a position of an object within a predetermined detection range outside of the vehicle based on the detection signal received;

probability distribution determining means for determining an existence probability distribution of the obstacle in a detecting direction toward the obstacle from the object sensor, and a maximum value in the existence probability distribution being used as a maximum probability of position of the obstacle, and the existence probability distribution having a range gradually decreased before and after the maximum probability of position of the obstacle in the detecting direction;

primary probability relationship making means for making a primary existence probability relationship representing a primary probability of existence of the obstacle in a horizontal plane coordinate using a plurality of the existence probability distributions throughout the entire of the predetermined detection range;

combining means for making a combined existence probability relationship by combining the primary existence probability relationship obtained in a current detecting period and a secondary existence probability relationship estimated based on a previous detection signal in a previous detecting period corresponding to the primary existence probability relationship of the current detecting period;

speed calculating means for calculating an estimated moving speed of the obstacle during a period from the detecting period of two times before to the previous detecting period based on the combined existence probability relationship obtained in the previous detecting period and the combined existence probability relationship obtained in the detecting period of two times before; and secondary probability relationship making means for making the secondary existence probability relationship based on the estimated moving speed of the obstacle and the combined existence probability relationship during the previous detecting period.

2. An obstacle detection system for a vehicle capable of detecting objects as obstacles existing around a vehicle based on a detection signal irradiated toward the objects and reflected from the objects per predetermined detecting period of scanning the detection signal, comprising:

an object sensor comprising a primary object sensor and a secondary object sensor which are different in detecting manner to each other, and each object sensor configured to detect existence/non-existence and a position of an object within a predetermined detection range outside of the vehicle based on the detection signal received;

primary probability distribution determining means for determining an existence probability distribution of the obstacle in a primary detecting direction toward the obstacle from the primary object sensor, and a maximum value in the existence probability distribution being used as a maximum probability of position of the obstacle, and the existence probability distribution having a range gradually decreased before and after the maximum probability of position of the obstacle in the primary detecting direction;

secondary probability distribution determining means for determining an existence probability distribution of the obstacle in a secondary detecting direction toward the obstacle from the secondary object sensor, and a maximum value in the existence probability distribution being used as a maximum probability of position of the obstacle, and the existence probability distribution having a range gradually decreased before and after the maximum probability of position of the obstacle in the secondary detecting direction;

probability relationship making means for making a primary existence probability relationship representing a primary probability of existence of the obstacle in a horizontal plane coordinate using a plurality of the existence probability distributions obtained by the primary probability distribution determining means throughout the entire of the predetermined detection range, and further to make a secondary existence probability relationship representing a secondary probability of existence of the obstacle in a horizontal plane coordinate using a plurality of the existence probability distributions obtained by the secondary probability distribution determining means throughout the entire of the predetermined detection range;

combining means for making a combined existence probability relationship by combining the primary existence probability relationship and the secondary existence probability relationship made by the probability relationship making means; and speed calculating means for calculating an estimated moving speed of the obstacle during a period from the detecting period of two times before to the previous detecting period based on the combined existence probability relationship obtained in the previous detecting period and the combined existence probability relationship obtained in the detecting period of two times before.

3. An obstacle detection system for a vehicle capable of detecting objects as obstacles existing around a vehicle, comprising:

a radar device configured to irradiate a transmission wave to the outside of a vehicle within a predetermined scanning-angle range per predetermined scanning period, and to receive the transmission wave reflected by an object as an obstacle and to detect existence/non-existence and position of the obstacle based on the reflected transmission wave;

probability distribution determining means configured to determine an existence probability distribution of the obstacle in a detecting direction of the transmission wave based on a relationship between an elapsed time counted from the irradiation of the transmission wave and the strength of the reflected transmission wave, and a maximum value in the strength of the reflected transmission wave being used as a maximum probability of position of the obstacle, and the existence probability distribution having a range gradually decreased before and after the maximum probability of position of the obstacle;

primary probability relationship making means configured to make a primary existence probability relationship representing a primary probability of existence of the obstacle in a horizontal plane coordinate using a plurality of the existence probability distributions determined by the probability distribution determining means based on the transmission wave irradiated throughout the entire of the scanning-angle range;

combining means configured to make a combined existence probability relationship by combining the primary existence probability relationship obtained in a current scanning period and a secondary existence probability relationship estimated based on a previous detection signal in a previous scanning period corresponding to the primary existence probability relationship of the current scanning period;

speed calculating means configured to calculate an estimated moving speed of the obstacle during a period from the scanning period of two times before to the previous scanning period based on the combined existence probability relationship obtained in the previous scanning period and the combined existence probability relationship obtained in the scanning period of two times before; and secondary probability relationship making means configured to make the secondary existence probability relationship based on the estimated moving speed of the obstacle and the combined existence probability relationship during the previous scanning period.

4. An obstacle detection system for a vehicle capable of detecting objects as obstacles existing around a vehicle, comprising:

a radar device comprising a primary radar device and a secondary radar device which irradiate different types of transmission waves to each other, and each radar device configured to irradiate a transmission wave to the outside of a vehicle within a predetermined scanning-angle range per predetermined scanning period, and to receive the transmission wave reflected by an object as an obstacle and to detect existence/non-existence and position of the obstacle based on the reflected transmission wave;

primary probability distribution determining means for determining an existence probability distribution of the obstacle to a distance of the transmission wave toward its irradiation direction based on a relationship between an elapsed time counted from the irradiation of the transmission wave by the primary radar device and the strength of the reflected transmission wave, and a maximum value in the strength of the reflected transmission wave being used as a maximum probability of position of the obstacle, and the existence probability distribution having a range gradually decreased before and after the maximum probability of position of the obstacle;

secondary probability distribution determining means for determining an existence probability distribution of the obstacle to a distance of the transmission wave toward its irradiation direction based on a relationship between an elapsed time counted from the irradiation of the transmission wave by the secondary radar device and the strength of the reflected transmission wave, and a maximum value in the strength of the reflected transmission wave being used as a maximum probability of position of the obstacle, and the existence probability distribution having a range gradually decreased before and after the maximum probability of position of the obstacle;

probability relationship making means for making a primary existence probability relationship representing a primary probability of existence of the obstacle in a horizontal plane coordinate using a plurality of the existence probability distributions determined by the primary probability distribution determining means based on each transmission wave irradiated throughout the entire of the scanning-angle range, and configured to make a secondary existence probability relationship representing a secondary probability of existence of the obstacle in a horizontal plane coordinate using a plurality of the existence probability distributions determined by the secondary probability distribution determining means based on each transmission wave irradiated throughout the entire of the scanning-angle range;

combining means configured to make a combined existence probability relationship by combining the primary existence probability relationship and the secondary existence probability relationship made by the probability relationship making means; and speed calculating means for calculating an estimated moving seed of the obstacle during a period from the detecting period of two times before to the previous detecting period based on the combined existence probability relationship obtained in the previous detecting period and the combined existence probability relationship obtained in the detecting period of two times before.

5. The obstacle detection system for a vehicle according to claim 3, wherein the radar device comprises a primary radar device and a secondary radar device which irradiate different types of transmission waves to each other, the probability distribution determining means comprises:
primary probability distribution determining means and;
secondary probability distribution determining means, wherein
the primary probability distribution determining means is for determining an existence probability distribution of the obstacle to a distance of the transmission wave toward its irradiation direction based on a relationship between an elapsed time counted from the irradiation of the transmission wave by the primary radar device and the strength of the reflected transmission wave, and a maximum value in the strength of the reflected transmission wave is used as a maximum probability of position of the obstacle, and the existence probability distribution has a range gradually decreased before and after the maximum probability of position of the obstacle, and the secondary probability distribution determining means is for determining an existence probability distribution of the obstacle to a distance of the transmission wave toward its irradiation direction based on a relationship between an elapsed time counted from the irradiation of the transmission wave by the secondary radar device and the strength of the reflected transmission wave, and a maximum value in the strength of the reflected transmission wave being used as a maximum probability of position of the obstacle, and the existence probability distribution having a range gradually decreased before and after the maximum probability of position of the obstacle, and wherein the primary probability relationship making means is for making a 1-1 existence probability relationship representing a probability of existence of the obstacle in a horizontal plane coordinate using a plurality of the existence probability distributions determined by the primary probability distribution determining means based on the transmission wave irradiated throughout the entire of the scanning-angle range, and is also for making a 1-2 existence probability relationship representing a probability of existence of the obstacle in a horizontal plane coordinate using a plurality of the existence probability distributions determined by the secondary probability distribution determining means based on the transmission wave irradiated throughout the entire of the scanning-angle range.

6. The obstacle detection system for a vehicle according to claim 1, wherein the primary existence probability relationship and the secondary existence probability relationship are expressed in an absolute coordinate system.

7. The obstacle detection system for a vehicle according to claim 2, wherein the primary existence probability relationship and the secondary existence probability relationship are expressed in an absolute coordinate system.

8. The obstacle detection system for a vehicle according to claim 3, wherein the primary existence probability relationship and the secondary existence probability relationship are expressed in an absolute coordinate system.

9. The obstacle detection system for a vehicle according to claim 4, wherein the primary existence probability relationship and the secondary existence probability relationship are expressed in an absolute coordinate system.

10. The obstacle detection system for a vehicle according to claim 5, wherein the primary existence probability relationship and the secondary existence probability relationship are expressed in an absolute coordinate system.

11. The obstacle detection system for a vehicle according to claim 1, wherein the range of the existence probability distribution in which the probability of existence is gradually decreased is within two or three times of a standard deviation of the probability of position of the obstacle from the maximum value in the existence probability distribution.

12. The obstacle detection system for a vehicle according to claim 2, wherein the range of the existence probability distribution in which the probability of existence is gradually decreased is within two or three times of a standard deviation of the probability of position of the obstacle from the maximum value in the existence probability distribution.

13. The obstacle detection system for a vehicle according to claim 3, wherein the range of the existence probability distribution in which the probability of existence is gradually decreased is within two or three times of a standard deviation of the probability of position of the obstacle from the maximum value in the existence probability distribution.

14. The obstacle detection system for a vehicle according to claim 4, wherein the range of the existence probability distribution in which the probability of existence is gradually decreased is within two or three times of a standard deviation of the probability of position of the obstacle from the maximum value in the existence probability distribution.

* * * * *